United States Patent [19]

Kamise et al.

[11] Patent Number: 4,769,707
[45] Date of Patent: Sep. 6, 1988

[54] TV OPTICAL EFFECT GENERATING SYSTEM

[75] Inventors: Chiharu Kamise, Hachioji; Hiroshi Sakamoto, Musashino, both of Japan

[73] Assignee: Fuji Television Incorporated, Tokyo, Japan

[21] Appl. No.: 52,625

[22] Filed: May 20, 1987

[51] Int. Cl.[4] .................. H04N 5/14; H04N 5/262; H04N 5/275

[52] U.S. Cl. ............................. 358/160; 358/22; 358/183

[58] Field of Search .............. 358/22, 160, 181, 183

[56] References Cited

U.S. PATENT DOCUMENTS

| | | |
|---|---|---|
| 2,073,370 | 3/1937 | Goldsmith et al. ............... 358/183 |
| 3,617,630 | 11/1971 | Reiffel ............................. 358/183 |
| 3,736,377 | 5/1973 | Warren, Jr. et al. ............. 358/183 |
| 4,045,815 | 8/1977 | Griffith et al. ................... 358/183 |

FOREIGN PATENT DOCUMENTS 0065576  4/1986  Japan .

Primary Examiner—James J. Groody
Assistant Examiner—Michael D. Parker
Attorney, Agent, or Firm—Pollock, Vande Sande and Priddy

[57] ABSTRACT

A key signal such as a TV signal or the like is provided to a liquid crystal TV panel, by which an image of a desired shape is displayed on the display screen of the liquid crystal TV panel at a position where an optical effect is intended to be produced. Light from a light source is applied to the liquid crystal TV panel, transmitted or reflected light therefrom is incident to an optical filter, and the image of transmitted light therefrom is picked up by a TV camera. The video output of the TV camera is mixed, by a video mixer, with a video signal of the image to be added with the optical effect.

9 Claims, 3 Drawing Sheets

TV OPTICAL EFFECT GENERATING SYSTEM

BACKGROUND OF THE INVENTION

The present invention relates to a TV optical effect generating system for generating a TV signal added with an optical effect which causes a particular portion of an image reproduced on a TV receiver to flash, glitter, or frost.

In TV broadcasting, for instance, titles of programs and commercial messages are usually added with various optical effects for attracting audiences' attention.

A conventional method of producing an optical effect on a movie film involves such cumbersome steps as follows: At first, the original film is processed for making, for example, only a specific portion in a certain frame transparent, or a film having a similar transparent portion is prepared by drawing. Such a film is irradiated by light from one side thereof, and transmitted light therethrough is photographed on a film through an optical filter, and then the photographed film is developed. The developed film and the original film bearing an image to be added with the optical effect are placed one on the other, and their images are concurrently printed on another film.

Accordingly, the traditional method is very troublesome and time-consuming. In addition, it is unknown, before the development of the film, to what extent the optical effect has been achieved. Where the intended optical effect has not been obtained, the above-mentioned steps must be repeated at least once more.

An object of the present invention is to provide a TV optical effect generating system which is able to produce a TV signal added with an optical effect, through simple processing and in a short time and which enables the optical effect to be checked immediately after the processing.

SUMMARY OF THE INVENTION

According to the present invention, a key signal such as a TV signal or similar one (a signal produced by a personal computer, for instance) is applied to a liquid crystal TV panel so that an image of an intended shape is displayed thereon at a position where an optical effect is to be produced. Then the liquid crystal TV panel is irradiated by light from a light source, and light transmitted through or reflected by the panel is applied to an optical filter, and further the image of light transmitted through the filter is picked up by a TV camera. The video output of the TV camera is mixed, by a video mixer, with a video signal of the image to be added with the optical effect.

DESCRIPTION OF THE PREFERRED EMBODIMENTS

Figure 1:
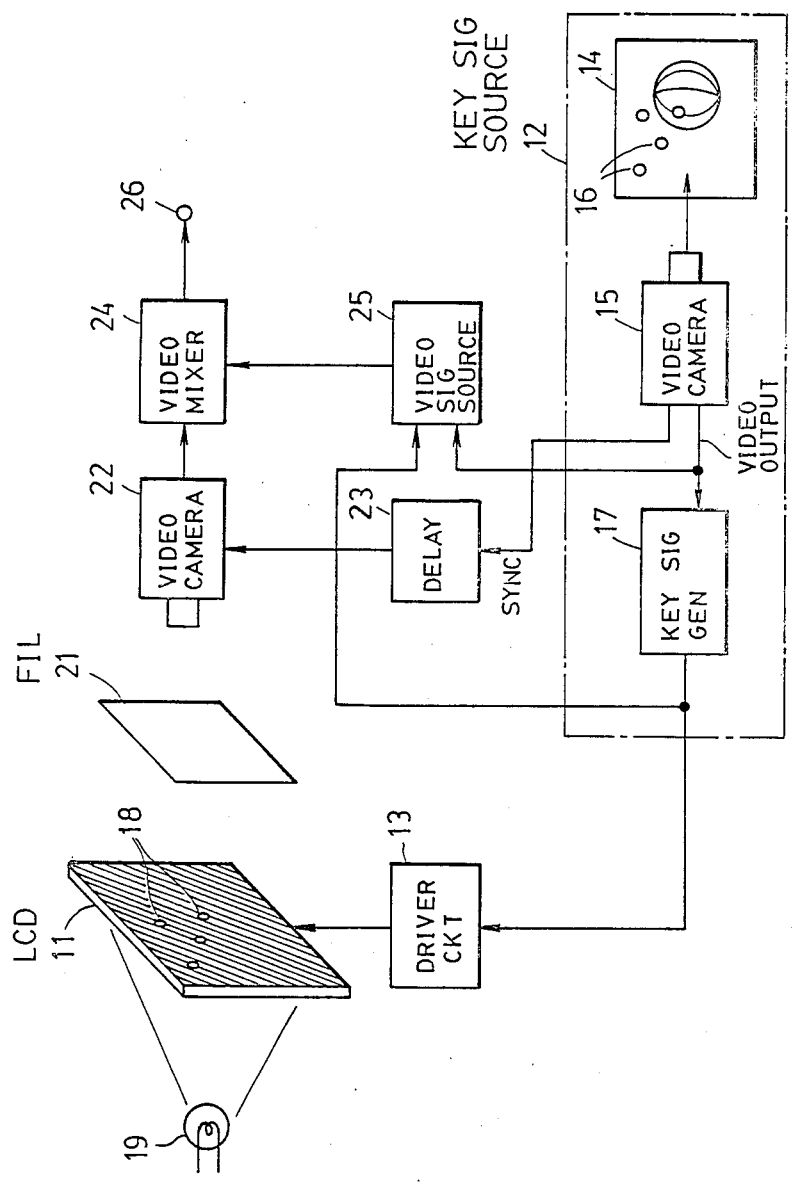
FIG. 1 is a block diagram illustrating an embodiment of the present invention.

FIG. 1 illustrates an embodiment of the present invention, which employs a transmission type liquid crystal TV panel 11. A key signal from a key signal source 12 is applied via a drive circuit 13 to the liquid crystal TV panel 11. Each pixel of the TV panel 11 is controlled, by the key signal, to be transparent, semitransparent, or opaque, displaying an image as a whole.

In this embodiment, a picture frame 14 is imaged by a TV camera 15 to produce a TV signal, which is processed to produce a key signal representing a specified image in the frame 14, i.e. images 16 in FIG. 1. The key signal is provided to the drive circuit 13. In this instance, the video output of the TV camera 15 is applied to a key signal generator 17, in which it is processed to obtain the key signal, for example, by extracting only a specific color component from the video signal in the same manner as is the case with the production of a so-called chroma-key signal. The key signal thus obtained is applied to the drive circuit 13. As a result, the areas of the images 16 in the frame 14 are displayed as transparent images 18 on the liquid crystal TV panel 11, the other areas being displayed dark.

A light source 19 is disposed at one side of the liquid crystal TV panel 11 to be irradiated. Light having transmitted through the liquid crystal TV panel 11 is incident to an optical filter 21. The optical filter 21 may be a conventional one which produces an optical effect, such as various scattering effect filters or a combination thereof. The optical filter 21 is adapted to be movable for obtaining various patterns, as required.

The image of transmitted light from the optical filter 21 is picked up by a TV camera 22. The TV camera 22 is supplied with synchronizing signals from the key signal source 12 for synchronization with the reproduction of images by the liquid crystal TV panel 11. A delay circuit 23 is provided at the input side of the TV camera 22, as required, for timing its image pick-up operation.

The video output of the TV camera 22 is provided to a video mixer 24, wherein it is mixed with other video signals from a video signal source 25 in synchronization therewith. In this embodiment, images other than the specified ones 16 in the frame 14 and images of the video output from the TV camera 22 are superimposed to create TV signals added with an optical effect. The video output of the TV camera 15 and the output of the key signal generator 17 are supplied to the video signal source 25, in which key signals are removed from the video output of the TV camera 15 to obtain the output video signal of the video signal source 25. The output video signal thus obtained is applied to the video mixer 24. Accordingly, there is provided at an output terminal 26 of the video mixer 24 a TV signal added with an optical effect such that, for example, the images 16 in the frame 14 keenly glare.

Figure 2A:
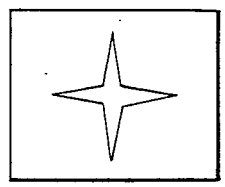
FIGS. 2A and 2B show examples of a key signal for use in the present invention.
Figure 2B:
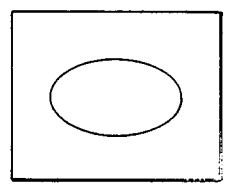

While in the above the key signal is produced by extracting from a video signal of a specified image in the actual picture frame, it may also be obtained by preparing a desired picture frame through handwriting or photographing with a camera, as shown in FIGS. 2A and B, and then by imaging the picture with a TV camera. The image of the video signal from the video signal source 25 may also be an image independent of the image of the key signal from the key signal source 12.

Figure 3:
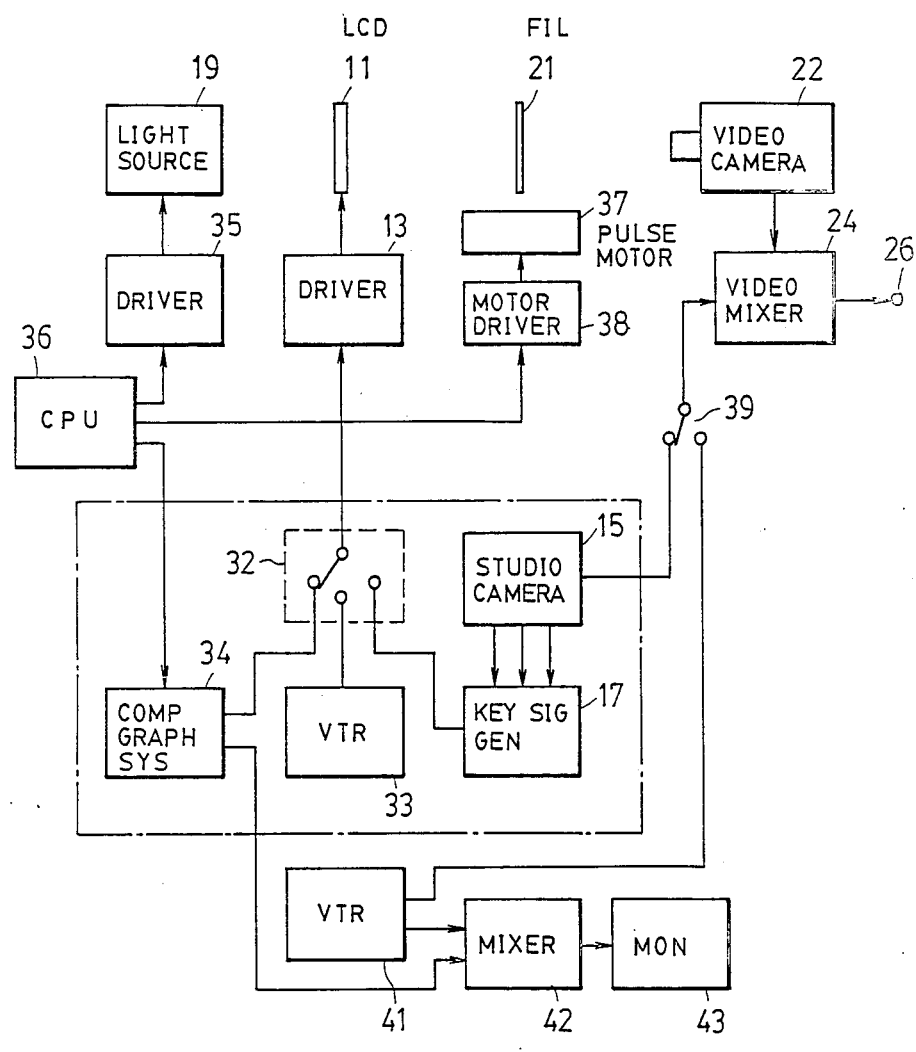
FIG. 3 is a block diagram illustrating another embodiment of the present invention which is provided with a plurality of key signal generating means.

The TV optical effect generating system of the present invention can be constituted, for example, as shown in FIG. 3. The parts corresponding to those in FIG. 1 are identified by the same reference numerals. Various outputs of the studio camera 15 are selectively applied to the key signal generator 17, which creates and supplies a part of the image to one of fixed contacts of a select switch 32. A key signal may be obtained as the output of a VTR 33 and applied to another fixed contact, and a key signal available from a computer graphic unit 34 may also be provided to still another fixed contact of the select switch 32. In other words, the key signal source 12 is able to selectively provide any one of the key signals from the studio camera 15, the VTR 33 and the computer graphic unit 34.

In this example, the light source 19 can be turned ON and OFF by controlling its driver 35 from a central processor 36, and the optical filter 21 can be rotated by a pulse motor 37 which is placed under control of the central processor 36 through a motor driver 38. With this arrangement, for instance, when such a cross-shaped image as depicted in FIG. 2A is produced by forming a circular transparent image on the liquid crystal TV panel 11 and filtering the transmitted light therefrom by the optical filter 21, the cross-shaped image can be turned by driving the filter 21 with the motor 37.

In the case where an image added with an optical effect, obtained by processing the key signal from the computer graphic unit 34, and for example, the output image of a VTR 41 are combined into a composite image, the output of the VTR 41 is provided via a switch 39 to the video mixer 24. In this instance, the outputs of the computer graphic unit 34 and the VTR 41 are combined in a mixer 42, the output of which is applied to a monitor 43.

Figure 4:
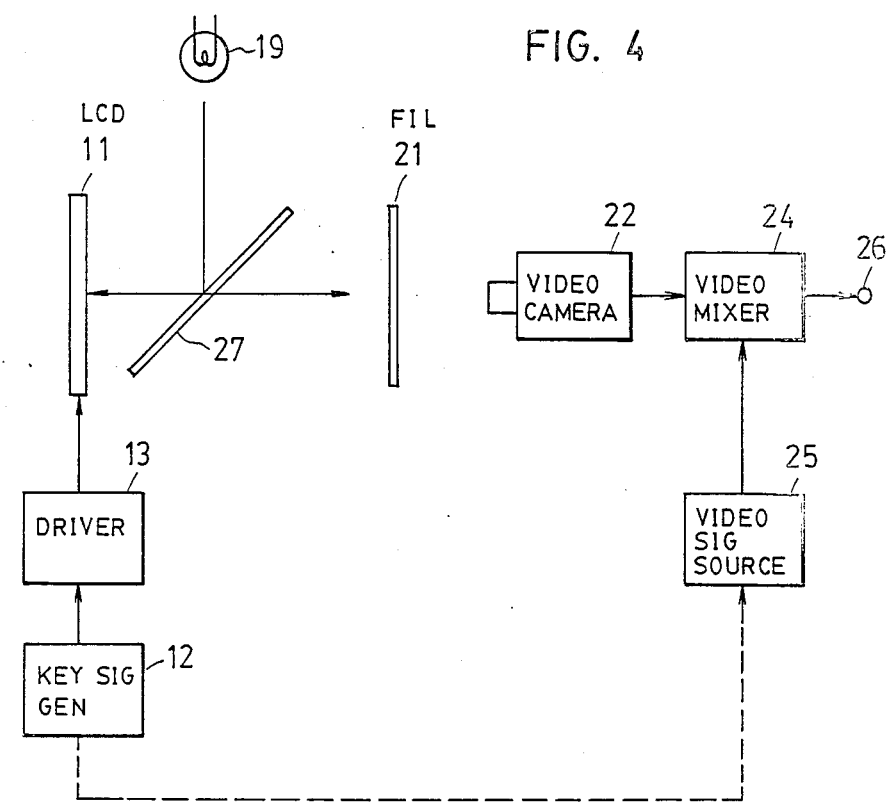
FIG. 4 is a block diagram illustrating still another embodiment of the present invention which employs a reflecting type liquid crystal TV panel.

In the above, the liquid crystal TV panel 11 is described to be the transmitting type but may also be the reflecting type. FIG. 4 shows an example employing the reflecting type liquid crystal TV panel. In FIG. 4 the parts corresponding to those in FIG. 1 are identified by the same reference numerals. A half-mirror 27 is disposed obliquely to the display screen of the reflecting type liquid crystal TV panel 11. Light from the light source 19 is applied to the half-mirror 27 and the reflected light therefrom is incident to the display screen of the liquid crystal TV panel 11. Light reflected by the liquid crystal TV panel 11 back to the half-mirror 27 partly passes therethrough and is incident to the optical filter 21. The other operations are the same as those described previously with regard to FIG. 1, and hence will not be described.

The light source 19 need not always be single but may also be plural. The optical effect can also be controlled in terms of time and position through ON-OFF control of one or more light sources. Where a color light source is used as the light source 19 and a color panel as the liquid crystal TV panel 11, the optical effect can be controlled dynamically in position by changing the color of the color light source in terms of time and position. The key signal is not limited specifically to the TV signal but may also be, for example, a video signal which is produced by a personal computer. Moreover, various additional effects can also be produced by moving the TV camera 22 back and forth and from side to side during its image pick-up operation or through use of a zoom lens. It is also possible to superimpose a plurality of liquid crystal TV panels 11 as one body and drive them by the same key signal so as to obtain a display image of sharp contrast.

As described above, the TV optical effect generating system of the present invention does not involve the development process of a film, and hence is capable of producing an optical effect relatively easily. In particular, the optical effect can be checked by reproducing the mixed video output at the output terminal 26 on a monitor TV for observing the reproduced image. By exchanging the optical filter 21 or changing the combination of filters, an adjustment for obtaining the intended optical effect can be made in a very short time immediately after checking the extent to which the optical effect of, for example, fogging a particular object or shining keenly a particular portion of metal in the image has been produced. It will be understood that the present invention is far more excellent than the conventional method of obtaining a desired optical effect by repeating time-consuming operations of developing a photographed film each time for checking the optical effect, adjusting the optical filter and then photographing again.

It will be apparent that many modifications and variations may be effected without departing from the scope of the novel concepts of the present invention.

What is claimed is:

1. A TV optical effect generating system comprising:
   a key signal source for generating a key signal such as a TV signal or the like;
   a liquid crystal TV panel which receives, as an input signal, the key signal from the key signal source and provides a display;
   a light source for applying light to the liquid crystal TV panel;
   an optical filter to which is incident transmitted or reflected light from the liquid crystal TV panel;
   a TV camera for picking up the image of transmitted light from the optical filter; and
   a video mixer for mixing the video output of the TV camera and another video signal.

2. A TV optical effect generating system according to claim 1, wherein the key signal source comprises a TV camera for the key signal and a key signal generator for generating a key signal of a TV signal of a selected specific object in an image picked up by the TV camera for the key signal.

3. A TV optical effect generating system according to claim 1, wherein the key signal source is a VTR having recorded therein a key signal of a TV signal.

4. A TV optical effect generating system according to claim 1, wherein the key signal source is a computer graphic unit for generating a key signal of a TV signal.

5. A TV optical effect generating system according to claim 1, wherein the key signal source is provided with plural kinds of key signal generating means and a select switch for selecting one of the key signal generating means and supplying the liquid crystal TV panel with a key signal produced by the selected key signal generating means.

6. A TV optical effect generating system according to claim 1, wherein the driving of the liquid crystal TV panel for display and the image pick-up operation of the TV camera are synchronized with each other.

7. A TV optical effect generating system according to claim 1, further comprising a means for ON-OFF control of the light source.

8. A TV optical effect generating system according to claim 1, further comprising a means for controlling the rotation of the optical filter.

9. A TV optical effect generating system according to claim 2, wherein the another video signal is the video output of the TV camera for the key signal.

* * * * *